United States Patent
Calibey et al.

(10) Patent No.: US 10,163,159 B2
(45) Date of Patent: *Dec. 25, 2018

(54) GRAPHICAL USER INTERFACE SYSTEM

(71) Applicant: HARTFORD FIRE INSURANCE COMPANY, Hartford, CT (US)

(72) Inventors: David A. Calibey, West Hartford, CT (US); John D. Diehl, Pottstown, PA (US); Lori A. LaForge, Ellington, CT (US); Eric F. Truntz, North Granby, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 223 days.

This patent is subject to a terminal disclaimer.

(21) Appl. No.: 15/142,895

(22) Filed: Apr. 29, 2016

(65) Prior Publication Data

US 2016/0314535 A1 Oct. 27, 2016

Related U.S. Application Data

(63) Continuation of application No. 14/936,212, filed on Nov. 9, 2015, now Pat. No. 9,563,918, which is a
(Continued)

(51) Int. Cl.
*G06Q 40/06* (2012.01)
*G06Q 40/08* (2012.01)
(Continued)

(52) U.S. Cl.
CPC .......... *G06Q 40/06* (2013.01); *G06F 3/0482* (2013.01); *G06F 3/0486* (2013.01); *G06F 3/04817* (2013.01); *G06Q 40/08* (2013.01)

(58) Field of Classification Search
CPC ........ G06Q 10/00; G06Q 20/00; G06Q 30/00; G06Q 40/00
(Continued)

(56) References Cited

U.S. PATENT DOCUMENTS

| | | |
|---|---|---|
| 6,012,043 A | 1/2000 | Albright et al. |
| 6,446,048 B1 | 9/2002 | Wells et al. |

(Continued)

OTHER PUBLICATIONS

Steps to Address America's Retirement Security Challenge, A Public Policy Point of View, Marsh & McLennan Companies. (Year: 2017).*

*Primary Examiner* — Frantzy Poinvil
(74) *Attorney, Agent, or Firm* — Howard IP Law Group

(57) ABSTRACT

A computer system configured to generate data to provide an interactive graphical interface for display on a remote user device is configured to provide an interactive graphical interface including first and second screen areas, and icons for user manipulation, each icon corresponding to a user goal. Icons corresponding to user goals of a first set are displayed within the first screen area, and icons corresponding to user goals of the second set are displayed in the second screen area. A gap is calculated and displayed based on data associated with icons and stored data. Responsive to receipt of data indicative of drag and drop movement of an icon between the first and second screen areas, the gap is recalculated and a resized gap is displayed.

20 Claims, 18 Drawing Sheets

Related U.S. Application Data continuation of application No. 13/316,952, filed on Dec. 12, 2011, now Pat. No. 9,183,592.

(60) Provisional application No. 61/493,005, filed on Jun. 3, 2011.

(51) Int. Cl.
*G06F 3/0481* (2013.01)
*G06F 3/0482* (2013.01)
*G06F 3/0486* (2013.01)

(58) Field of Classification Search
USPC .................................................. 705/3–44
See application file for complete search history.

(56) References Cited

U.S. PATENT DOCUMENTS

| | | | |
|---|---|---|---|
| 7,725,345 B2 * | 5/2010 | Furin | G06Q 10/0637 705/7.29 |
| 7,725,645 B2 | 5/2010 | Qawami | |
| 7,797,218 B2 | 9/2010 | Rosen et al. | |
| 8,069,103 B1 | 11/2011 | Davis | |
| 8,195,503 B2 | 6/2012 | Furin et al. | |
| 8,200,562 B2 | 6/2012 | Sheridan | |
| 8,423,444 B1 | 4/2013 | Mackrell et al. | |
| 8,423,469 B2 * | 4/2013 | Marlow | G06Q 30/00 705/30 |
| 8,577,702 B2 | 11/2013 | Schoen et al. | |
| 8,595,032 B1 * | 11/2013 | Schoen | G06Q 40/08 705/35 |
| 8,930,228 B1 | 1/2015 | Ball | |
| 8,930,253 B1 * | 1/2015 | Ball | G06Q 40/00 705/35 |
| 2001/0037294 A1 | 11/2001 | Freishtat et al. | |
| 2002/0042751 A1 | 4/2002 | Sarno | |
| 2002/0111890 A1 | 8/2002 | Sloan et al. | |
| 2002/0143680 A1 | 10/2002 | Walters et al. | |
| 2002/0169702 A1 | 11/2002 | Eaton, Jr. et al. | |
| 2003/0167220 A1 * | 9/2003 | Schoen | G06Q 40/02 705/36 R |
| 2005/0187802 A1 | 8/2005 | Koeppel | |
| 2007/0156559 A1 * | 7/2007 | Wolzenski | G06Q 40/00 705/35 |
| 2008/0010086 A1 * | 1/2008 | Skelly | G06F 19/328 705/2 |
| 2010/0004957 A1 * | 1/2010 | Ball | G06Q 40/00 705/4 |
| 2010/0250424 A1 | 9/2010 | Torres | |
| 2011/0106691 A1 | 5/2011 | Clark et al. | |
| 2012/0310807 A1 | 12/2012 | Calibey et al. | |
| 2013/0268461 A1 * | 10/2013 | Graff | G06Q 40/00 705/36 R |
| 2014/0058976 A1 | 2/2014 | Goodrich et al. | |

* cited by examiner

GRAPHICAL USER INTERFACE SYSTEM

CROSS-REFERENCE TO RELATED APPLICATIONS

This is a continuation application of and claims priority to U.S. patent application Ser. No. 14/936,212 filed Nov. 9, 2015, now U.S. Pat. No. 9,563,918, which claims the benefit of U.S. patent application Ser. No. 13/316,952 filed Dec. 12, 2011, now U.S. Pat. No. 9,183,592, which claims the benefit of U.S. Provisional Patent Application No. 61/493,005, filed Jun. 3, 2011, the entire contents of each of which are incorporated herein by reference for all purposes.

BACKGROUND

A person may be interested in learning about and planning for their financial future, especially as it relates to his or her retirement. For example, a person may have certain goals and/or expenses that may need to be balanced with likely monthly income that will be available after retirement (e.g., from Social Security or a retirement pension) and any assets owned by the person (e.g., a 401(k) savings account). The calculations associated with such a balance can depend on a number of different factors, such as a person's age, date of retirement, predicting inflation rates, etc. Many people may find these types of calculations and decisions associated with their retirement options to be confusing and even intimidating. As a result, some people avoid planning for their retirement.

It would therefore be desirable to provide systems and methods to efficiently and accurately facilitate financial planning associated with retirement goals.

SUMMARY OF THE INVENTION

According to some embodiments, systems, methods, apparatus, computer program code and means may be provided to efficiently and accurately facilitate financial planning associated with retirement goals. In some embodiments, a first set of user goals is categorized as basic expenses and a second set of user goals is categorized as optional expenses. Icons associated with the basic expenses may be graphically displayed in a first screen area, and icons associated with the optional expenses may be graphically displayed in a second screen area. An indication may be received from a remote user that a selected icon is to be associated with one of the first or second areas. Based on the received indication, a user goal associated with the selected icon may be re-categorized (e.g., as a basic or optional expense).

Some embodiments comprise: means for categorizing a first set of user goals as basic expenses and a second set of user goals as optional expenses; means for graphically displaying icons associated with the basic expenses in a first screen area; means for graphically displaying icons associated with the optional expenses in a second screen area; means for receiving from a remote user an indication that a selected icon is to be associated with one of the first or second areas; and means for re-categorizing a user goal associated with the selected icon based on the received indication.

A technical effect of some embodiments of the invention is may be an improved and computerized method of performing financial planning associated with retirement goals. With these and other advantages and features that will become hereinafter apparent, a more complete understanding of the nature of the invention can be obtained by referring to the following detailed description and to the drawings appended hereto.

DETAILED DESCRIPTION

Figure 1:
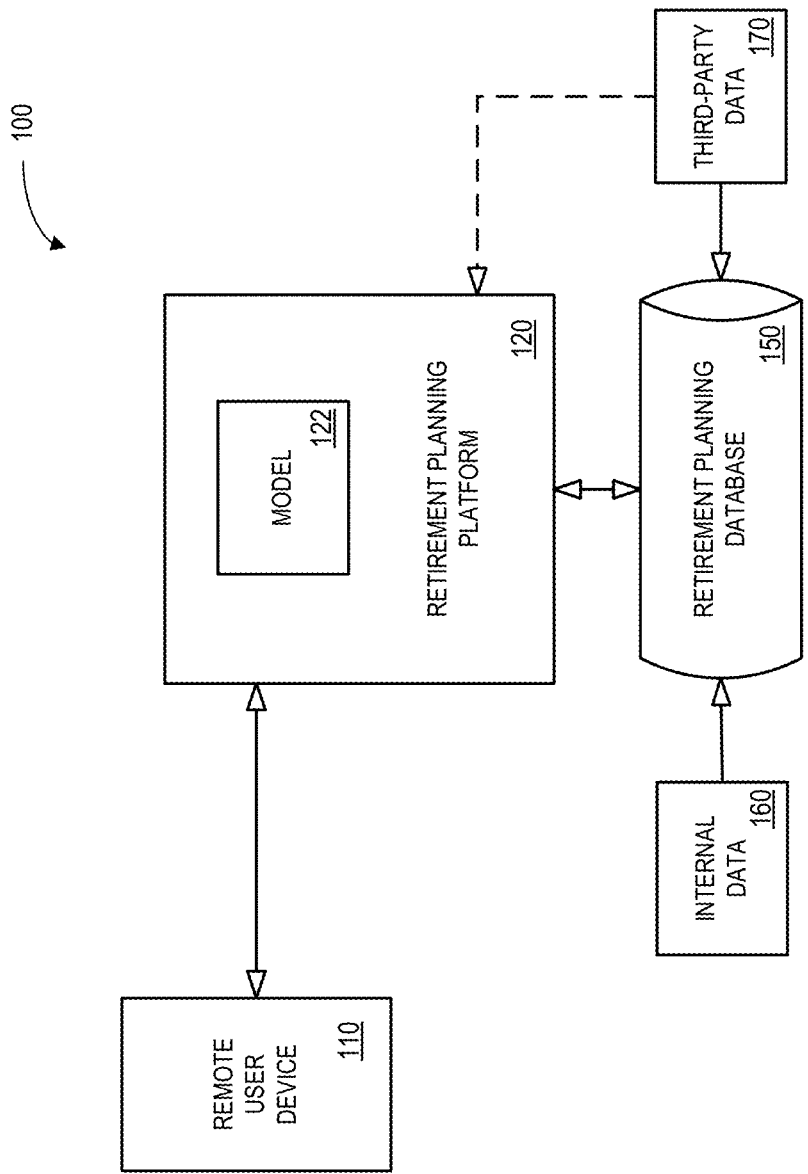
FIG. 1 is block diagram of a system according to some embodiments of the present invention.

FIG. 1 is block diagram of a system 100 according to some embodiments of the present invention. In particular, a remote user device 110 may submit retirement planning information to a retirement planning platform 120. According to some embodiments, multiple remote user devices 110 may submit retirement information to the retirement planning platform 120 via a web browser and/or a plug-in for a web browser. Note that some or all of the functions described with respect the retirement planning platform 120 might be performed instead by the user device 110 itself. The remote user devices 110 might comprise, for example, Personal Computers (PCs), laptop computers, and/or wireless telephones that can transmit retirement data to the retirement planning platform 120.

According to some embodiments, the "automated" retirement planning platform 120 may help a user explore and/or organize retirement goals. As used herein, the term "automated" may refer to, for example, actions that can be performed with little or no human intervention. By way of example only, the retirement planning platform 120 may be associated and/or communicate with a PC, an enterprise server, or a database farm. Moreover, according to some embodiments, a model 122 (e.g., a multi-dimensional and/or weighted model) at the platform 120 may facilitate financial predictions and/or planning.

As used herein, devices, including those associated with the retirement planning platform 120, and any other device described herein may exchange information via any communication network (not illustrated in FIG. 1) which may be one or more of a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

Although a single retirement planning platform 120 is shown in FIG. 1, any number of such devices may be included. Moreover, various devices described herein might be combined according to embodiments of the present invention. For example, in some embodiments, the retirement planning platform 120 and a retirement planning database 150 might be co-located and/or may comprise a single apparatus. Moreover, according to some embodiments, internal data 160 (e.g., data about a user's financial accounts) and/or third-party data 170 (e.g., a dynamic governmental interest rate) may be used to supplement the information in the retirement planning database 150. Note that the internal data 160 and/or third-party data 170 might also be provided directly to the platform 120 and/or model 122 (e.g., as illustrated by the dashed arrow in FIG. 1).

Figure 2:
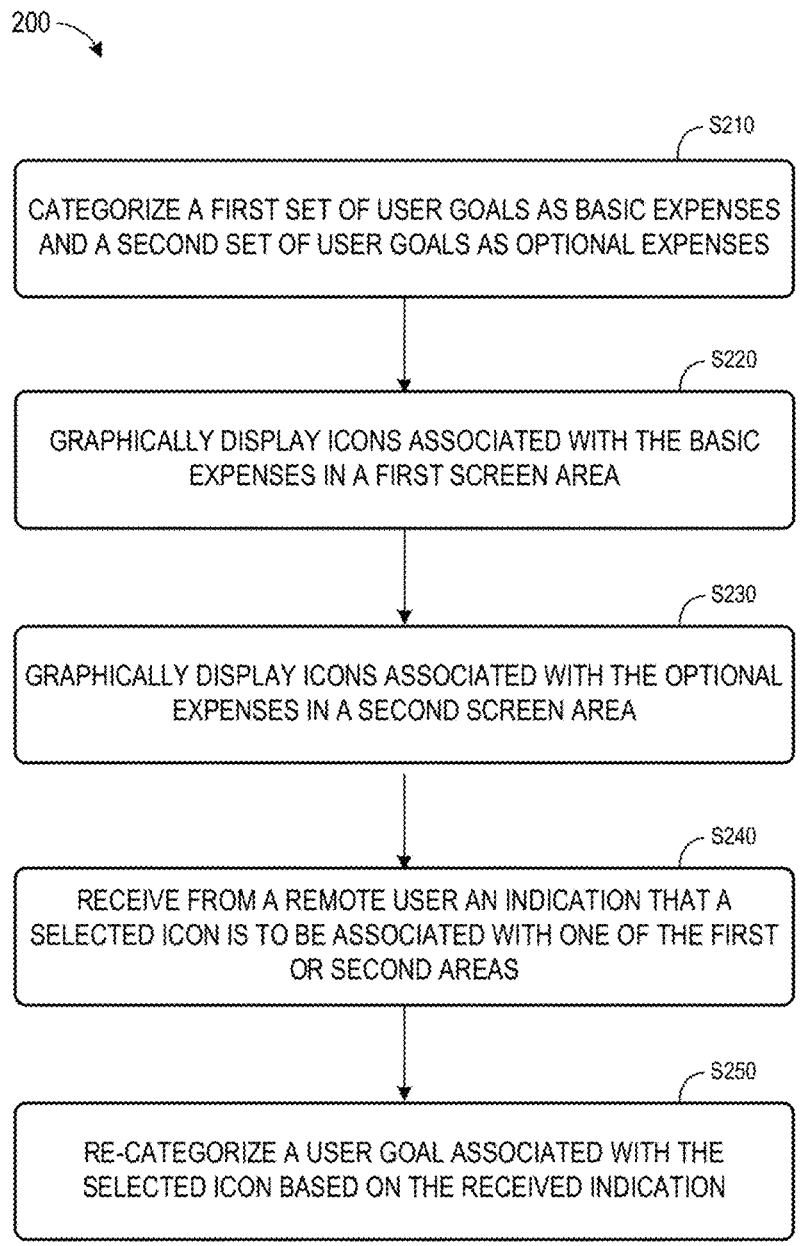
FIG. 2 illustrates a method according to some embodiments of the present invention.

The system 100 of FIG. 1 may be used to help a person explore various options associated with his or her retirement in a way that is simple to understand. For example, FIG. 2 illustrates a process 200 that might be performed, for example, by some or all of the elements of the system 100 described with respect to FIG. 1 according to some embodiments. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

The process 200 may be performed to facilitate a person's understanding and/or organization of retirement information. Pursuant to some embodiments, at S210 a first set of user goals may be categorized as "basic" expenses. These expenses might be considered things that must be provided for in retirement, such as (i) housing expenses, (ii) automobile expenses, (iii) food expenses, (iv) health care expenses, and/or or (v) utility expenses. Similarly, a second set of user goals may be categorized as "optional" expenses. These expenses might be, for example, things that might be "nice to have" in retirement, such as (i) travel expenses, (ii) entertainment expenses, (iii) family expenses, (iv) housing expenses (e.g., associated with a second vacation home), (v) education expenses, and/or (vi) charity expenses.

At S220, icons associated with the basic expenses may be graphically displayed in a first screen area. Similarly, at S230 icons associated with the optional expenses may be displayed in a second screen area. For example, icons associated with basic expenses might be displayed on the left portion of a computer screen while icons associated with optional expenses are displayed on the right portion. One example, of such a display is described herein in connection with FIG. 5.

At S240, an indication may be received from a remote user that a selected icon is to be associated with one of the first or second areas. For example, the user might click on an icon to "drag and drop" the icon to a different area of the computer screen. At S250, a user goal associated with the selected icon may be re-categorized based on the received indication. For example, an expense that was originally categorized as an "optional" expense might be re-categorized as a "basic" expense.

In accordance with the basic and optional expenses, a retirement planning system may interact with the user to help him or her explore various retirement planning options. For example, the system might determine predictable monthly retirement income associated with the user along with retirement assets associated with the user. A financial gap associated with the user might then be calculated representing the different between the income the user may need and the income the user can currently count on. The gap might be based at least in part on, for example, (i) a user age, (ii) a spouse age, (iii) a current income, and/or (iv) a retirement age. The system might also graphically generate a retirement planning report for the user and/or automatically facilitate a posting of retirement information associated with the user to a social media web site.

Figure 3:
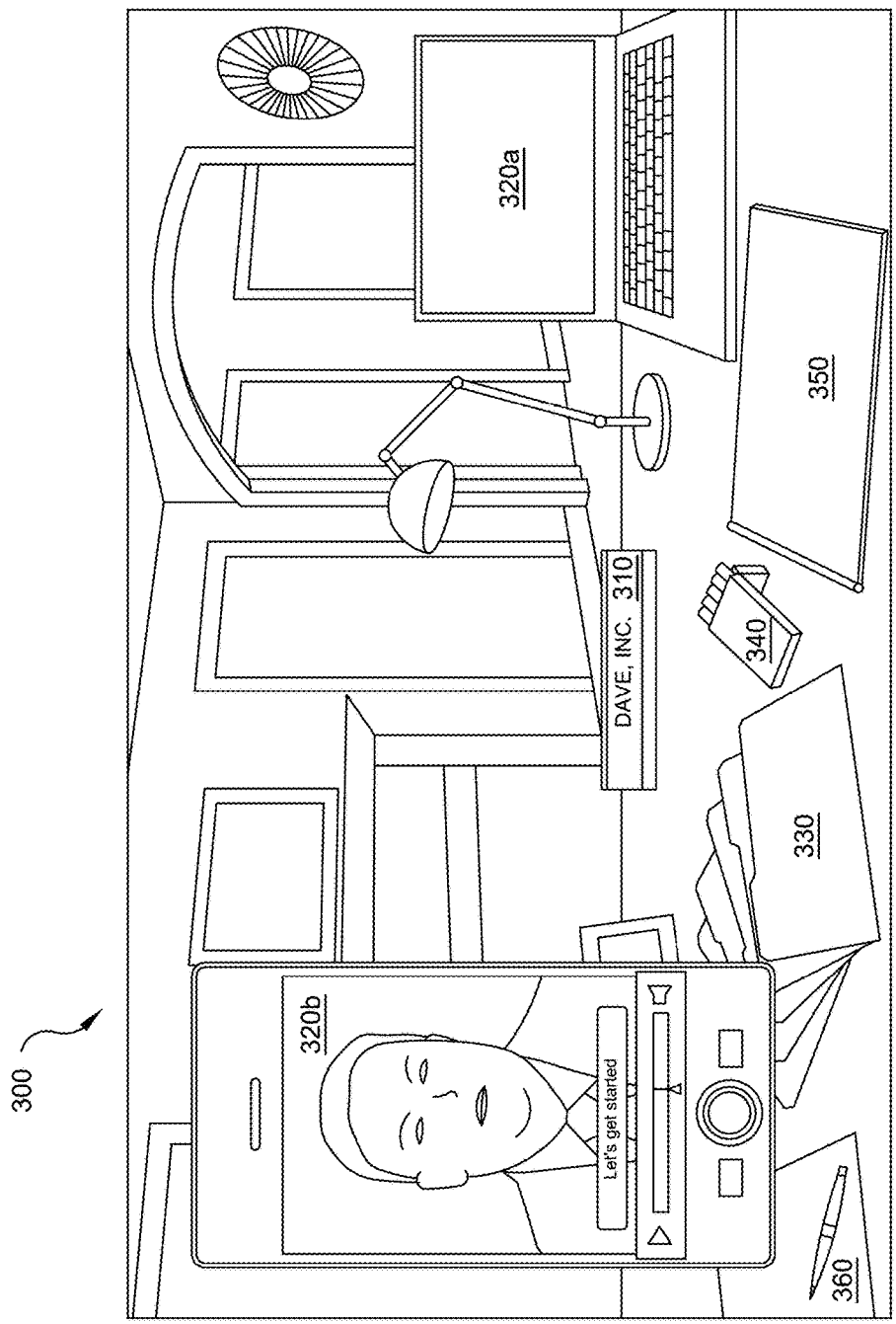
FIGS. 3 through 13 illustrate retirement planning displays according to some embodiments.

According to some embodiments, the retirement planning system may interact with a user via an easy to understand Graphical User Interface ("GUI"). For example, FIGS. 3 through 13 illustrate retirement planning displays according to some embodiments. In particular, FIG. 3 illustrates a retirement planning display 300 wherein a nameplate icon 310 may let a user provide his or her name or other identifier. A virtual computer monitor 320*a* or virtual handheld device 320*b* may provide training, help, and other retirement planning information to the user. According to some embodiments, the display 300 may work together with an actual handheld device (instead of a virtual handheld device) to exchange retirement planning information with a user. A folder icon 330 may be used to receive categorized expenses from the user, a pen icon 360 may be used to enter income and asset data, and a statement icon 340 may provide a summary of a user's retirement goals. Finally, a report icon 350 may be selected to generate a retirement report for the user.

Figure 4:
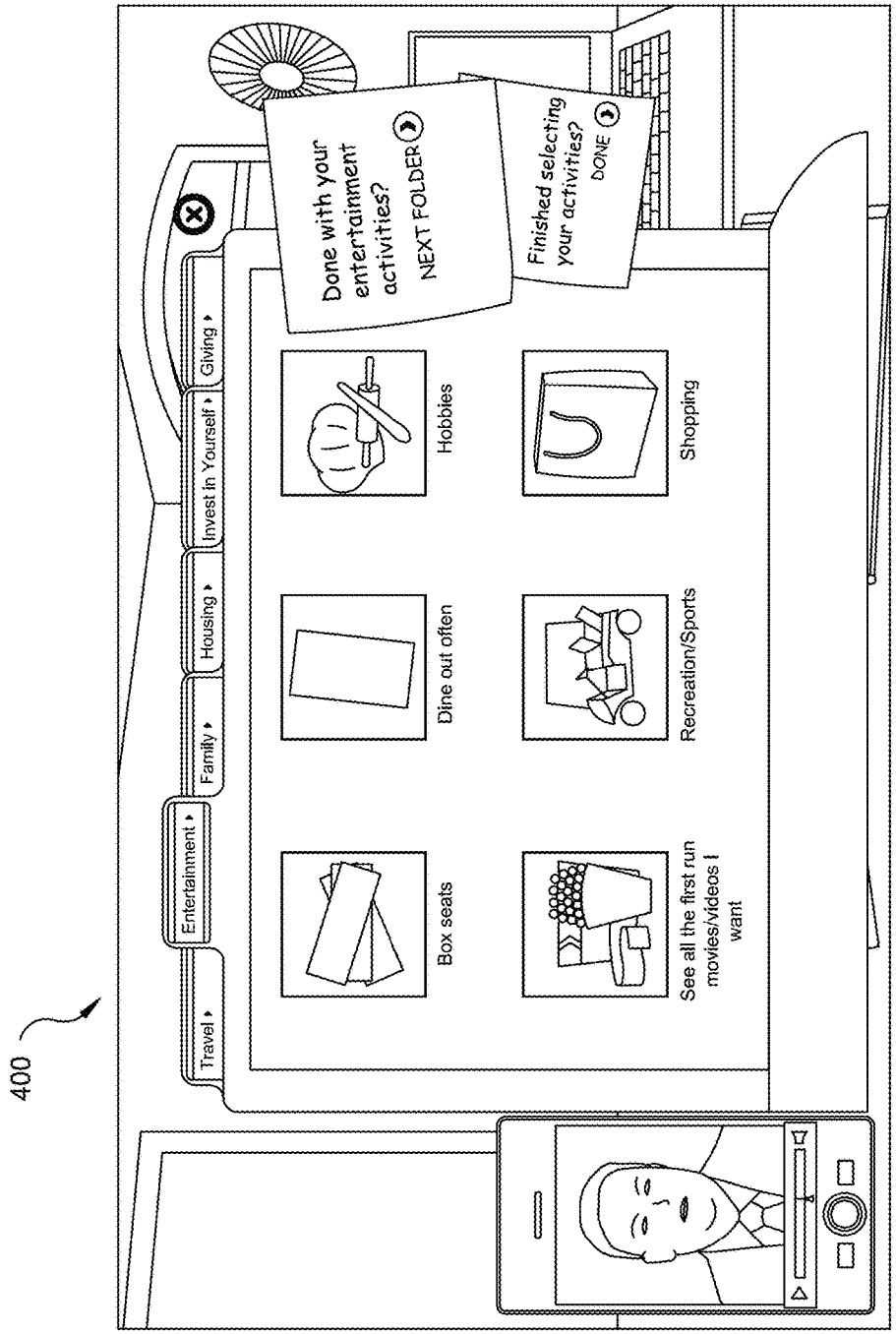

FIG. 4 illustrates a retirement planning display 400 that might be provided, for example, when a user selects the folder icon 330 of FIG. 3. The display 400 may let a user enter information about retirement expenses, such as travel, entertainment, family, housing, educational, and/or charitable expenses. After a user selects the expenses that he expects to be relevant to his or her retirement, he or she may categorize the expenses via a retirement planning display 500 such as the one illustrated in FIG. 5. In particular, the display 500 includes a first area for "must-have" expense icons and a second area 520 for "nice-to-have" expense icons. The user may then move icons to the appropriate areas 510, 520.

Figure 6:
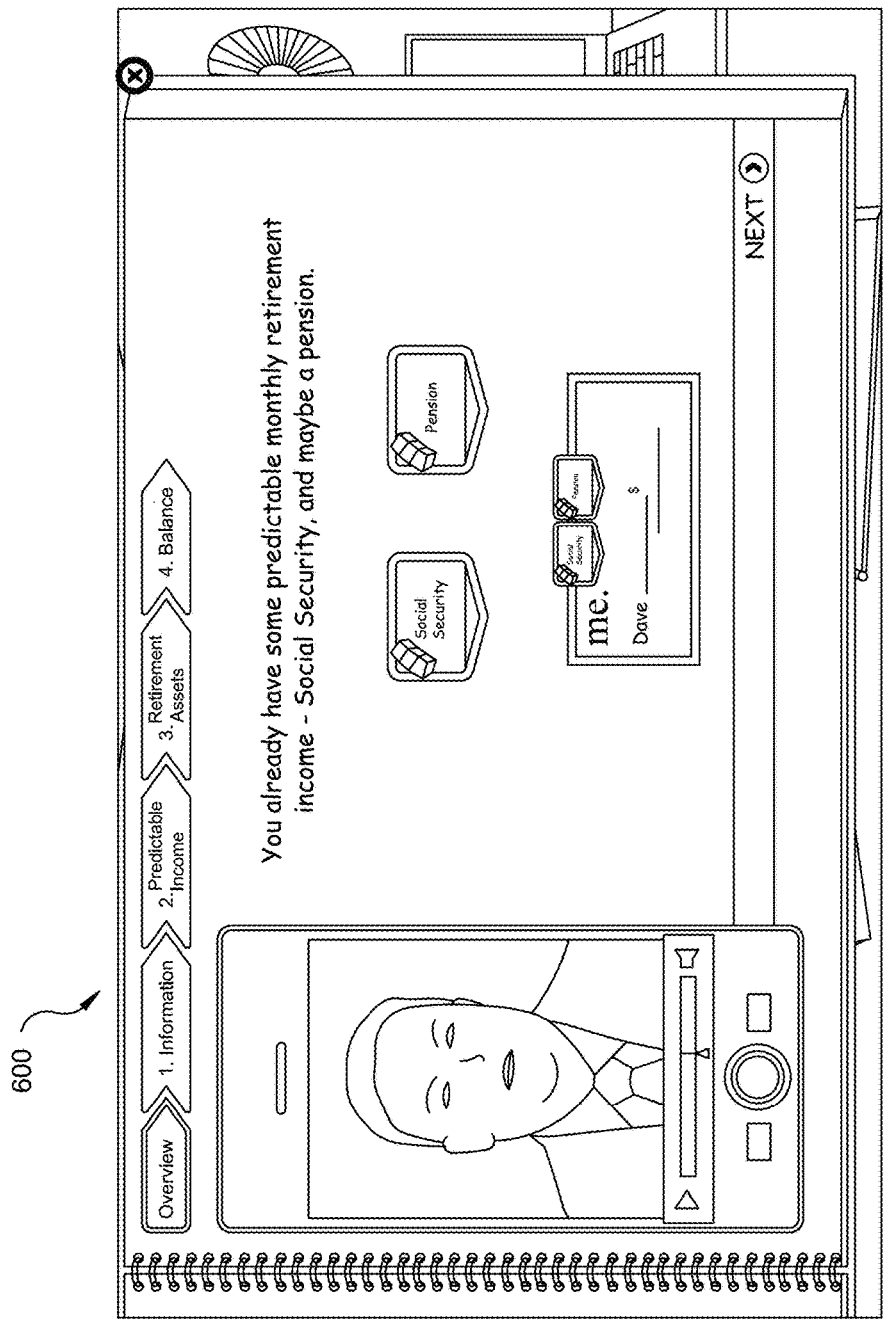
Figure 7:
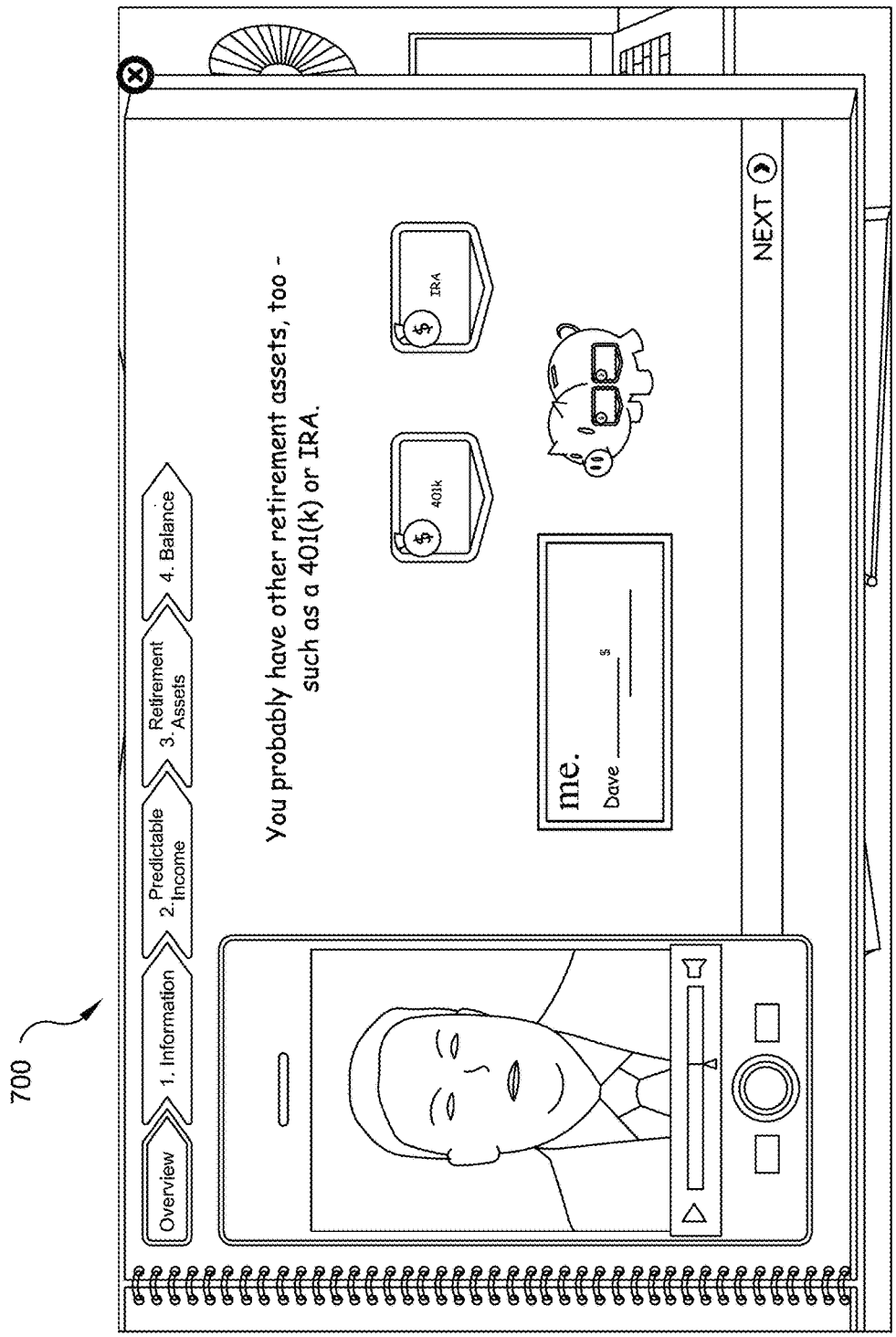

FIG. 6 illustrates a retirement planning display 600 that may receive predictable monthly retirement income information from a user. The predictable monthly income might be associated with, for example, Social Security payments and/or a pension. FIG. 7 illustrates a retirement planning display 700 that may receive retirement asset information from a user. The retirement assets might be associated with, for example, a 401(k) savings account or an Individual Retirement Account ("IRA").

Figure 8:
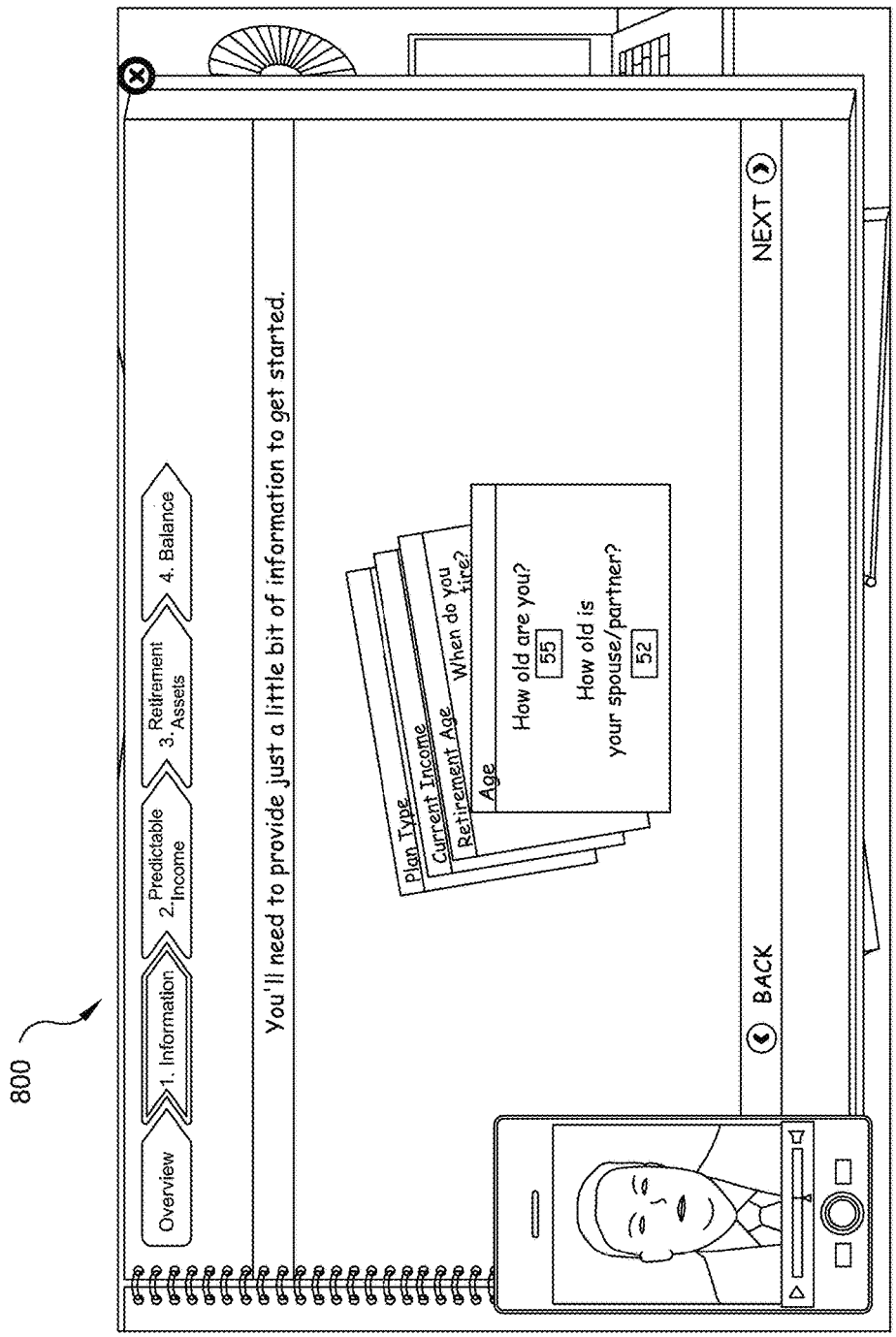
Figure 9:
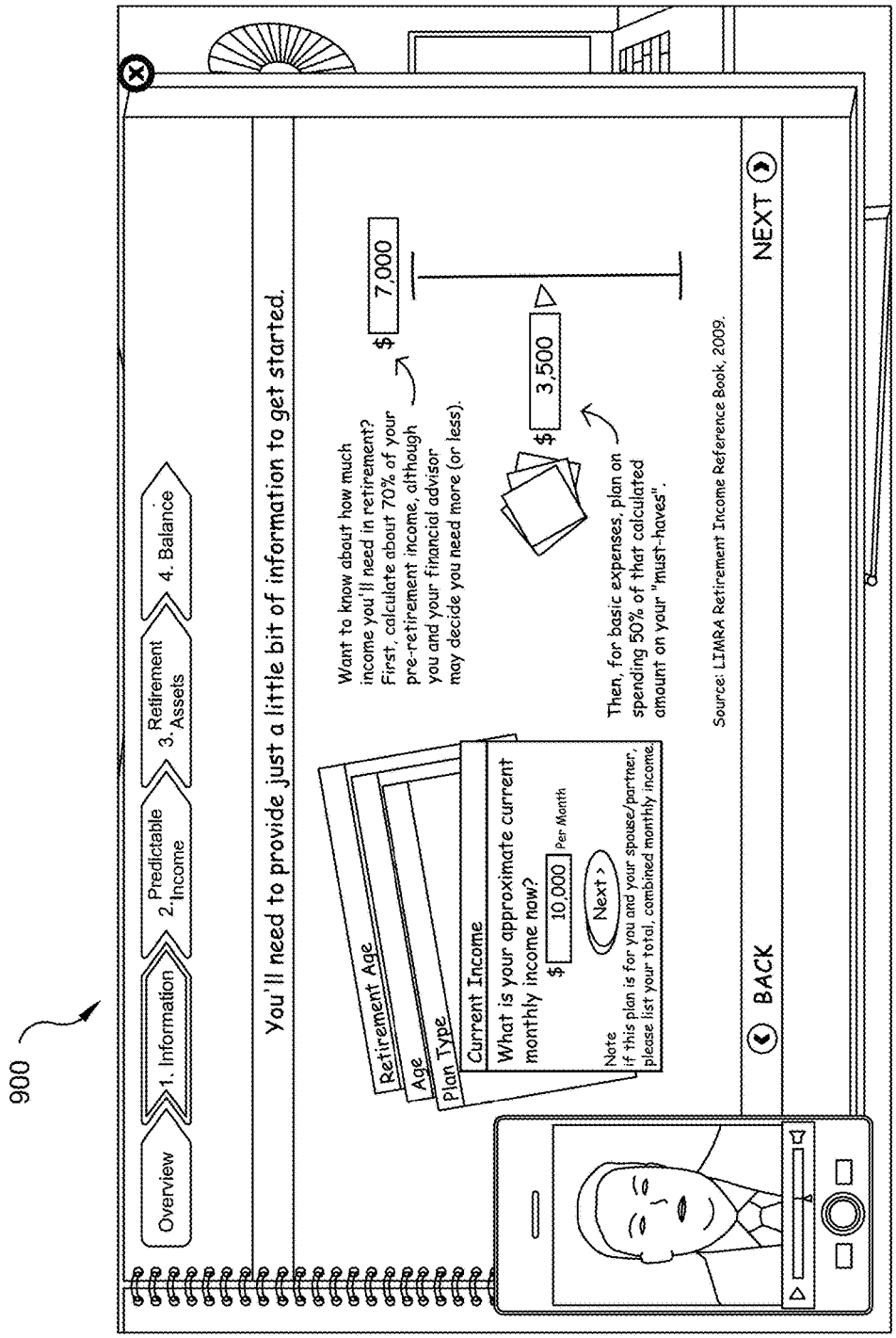

FIG. 8 illustrates a retirement planning display 800 that might receive current income information, retirement age information, and/or current age information associated with a user and/or his or her spouse. FIG. 9 illustrates a retirement planning display 900 that may be used, for example, to help a user estimate how much income they will need during retirement (e.g., on a monthly basis) based on his or her current income and basic expenses categorized via the display 500 of FIG. 5.

Figure 5:
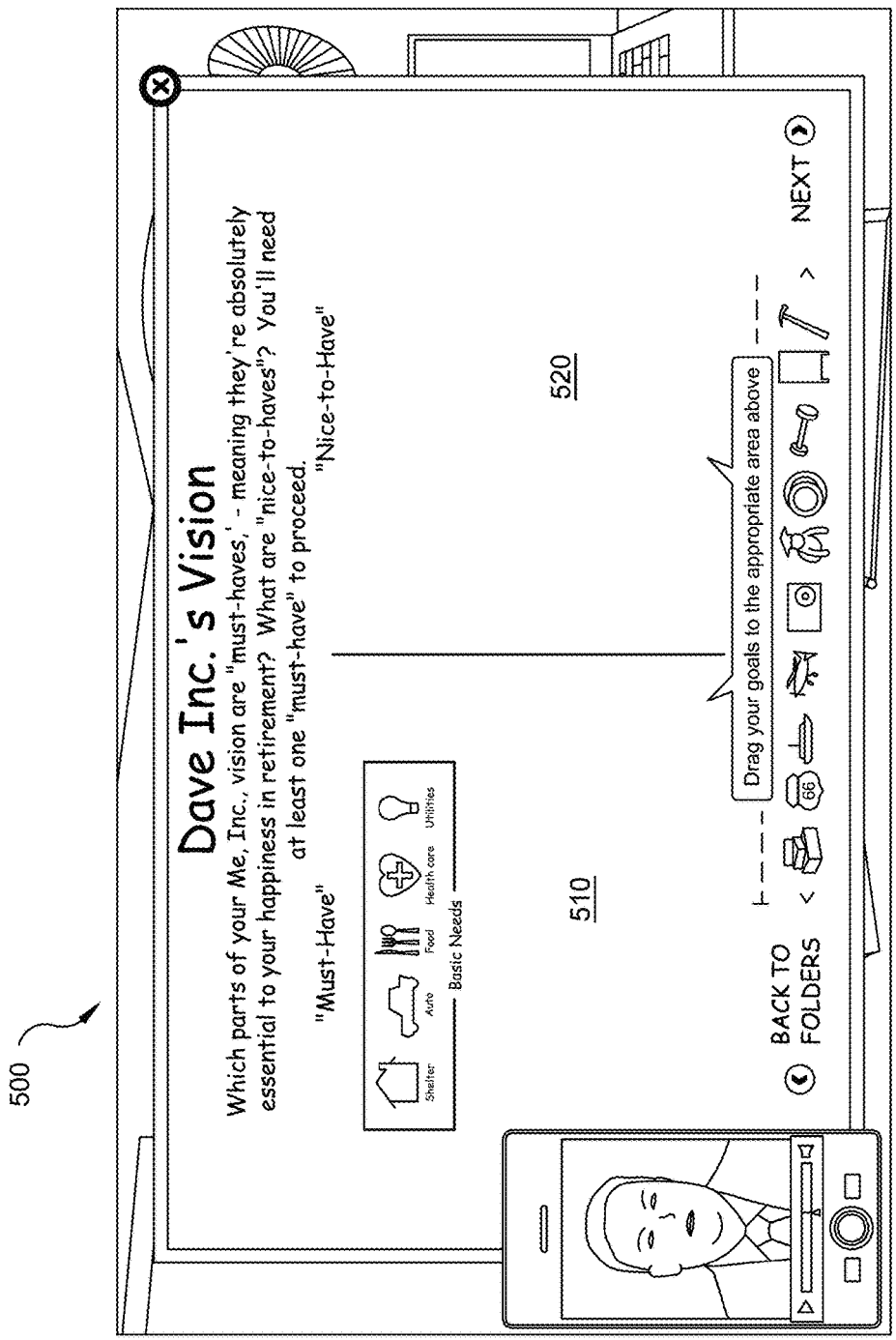
Figure 10:
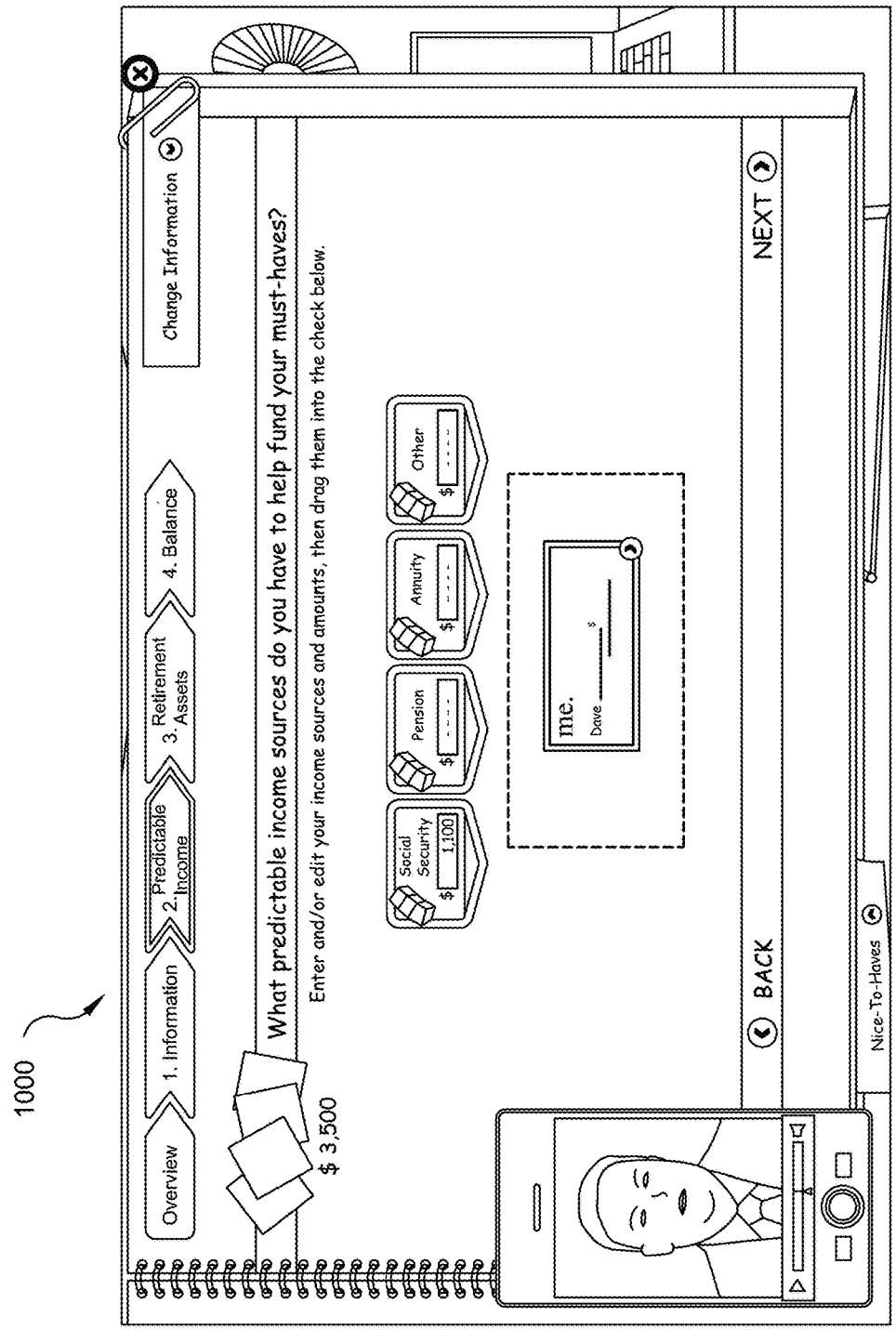
Figure 11:
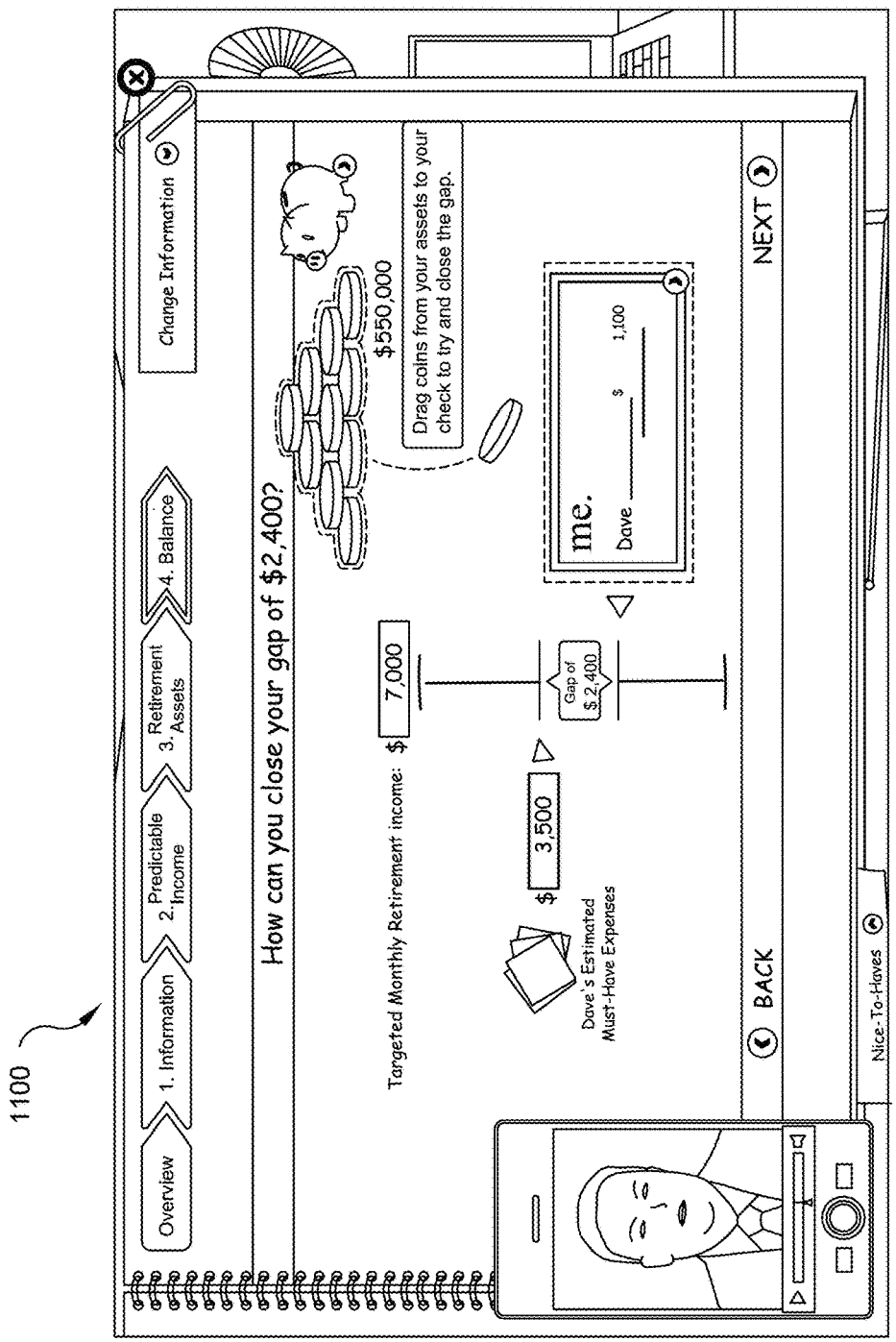

FIG. 10 illustrates a retirement planning display 1000 that may help a user figure out which predictable income sources may be used to fund the "must-have" expenses categorized via the display 500 of FIG. 5. For example, Social Security, pension, annuity, and/or other sources may be used to fund those expenses. If there is a gap between a person's available retirement income and retirement expenses, he or she may access a retirement planning display 1100 such as the one illustrated in FIG. 11. In particular, a gap value is visually illustrated on the display and a user may drag and drop coin icons to convert retirement assets into retirement income (e.g., based on a predicted interest rate). That is, the system may display a graphical representation of the retirement assets associated with the user in an asset area of the display (e.g., illustrated as a pile of coin tokens in FIG. 11). The system may also display a graphical representation of the predicable monthly retirement income in an income area of the display (e.g., illustrated as a personal check in FIG. 11). The system may then receive from the user an indication that a token is moved between the income and asset areas of the display (e.g., the coin token being dragged from the pile of coin tokens to the personal check as illustrated by the dotted line in FIG. 11). Responsive to said receiving, the system may re-calculate the financial gap and adjust the graphical display of the financial gap based on the re-calculation (e.g., the vertical monthly retirement income bar of FIG. 11). Note that a single coin token might represent a pre-determined monetary value (e.g., $1,000) or a pre-determined portion of another value (e.g., 10% of the user's assets).

Figure 12:
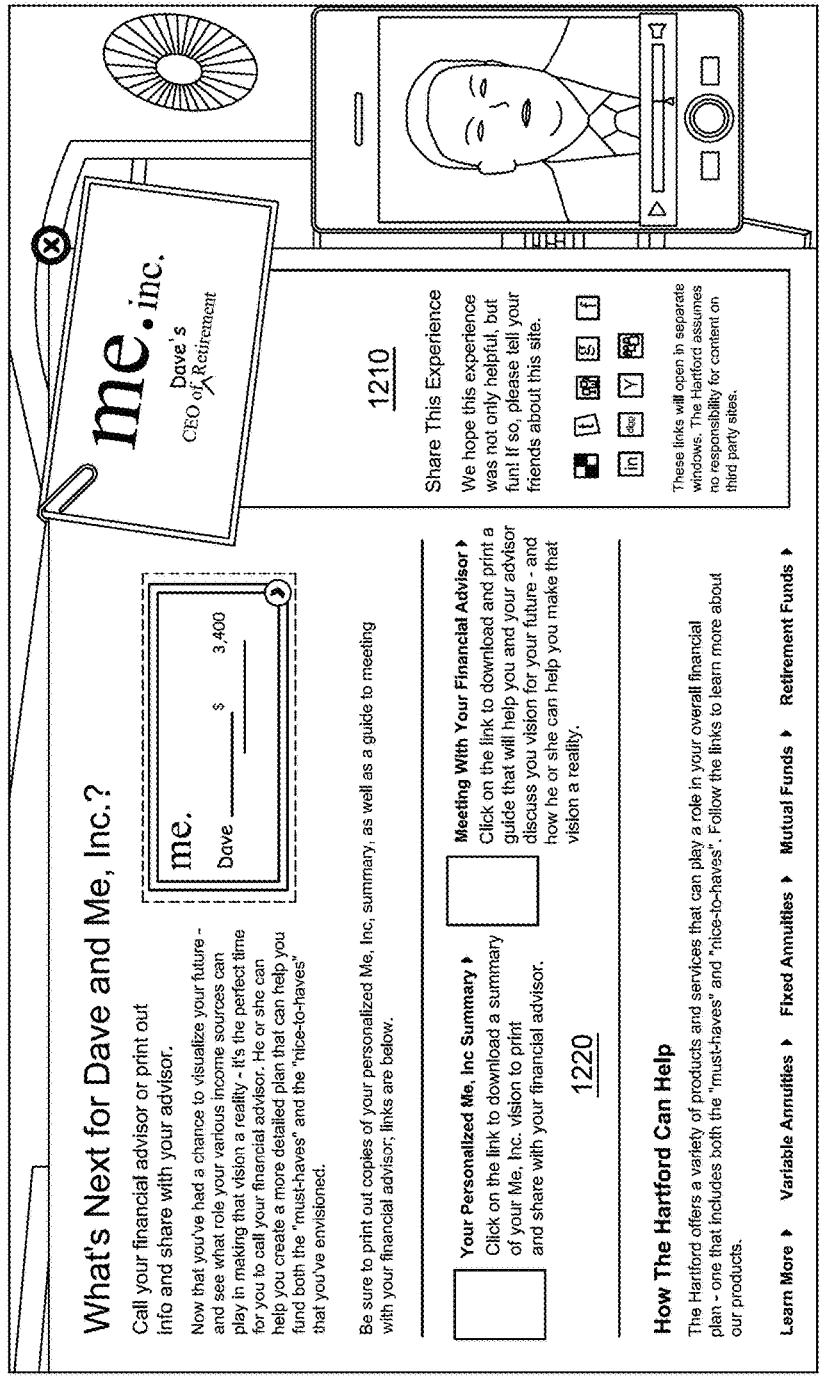
Figure 13:
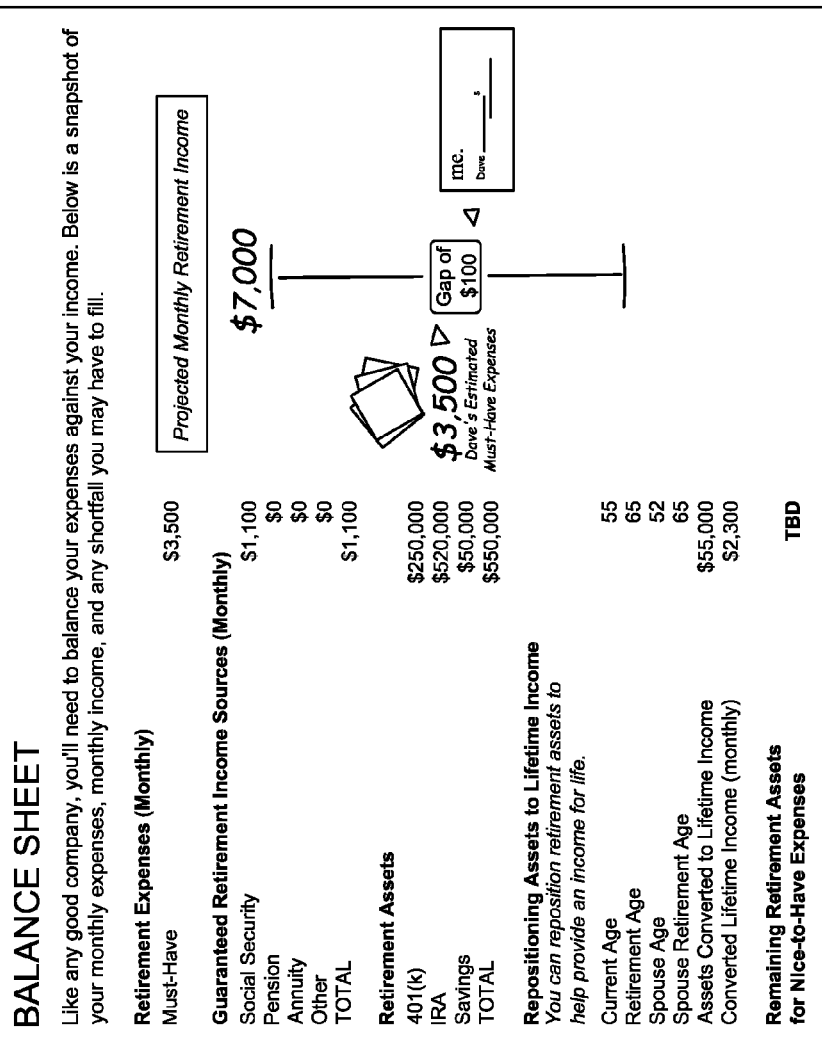

FIG. 12 illustrates a retirement planning display 1200 that includes one or more icons 1210 that a user might select to share retirement information via a social media web site, such as Facebook, Twitter, etc. The display 1200 further includes an icon 1220 may generate a personalized retirement summary for the user. For example, FIG. 13 illustrates a retirement planning display 1300 that summarizes a user's retirement information, including monthly retirement expenses, guaranteed retirement income, retirement assets, and repositioned assets that may be converted to lifetime income.

Figure 14:
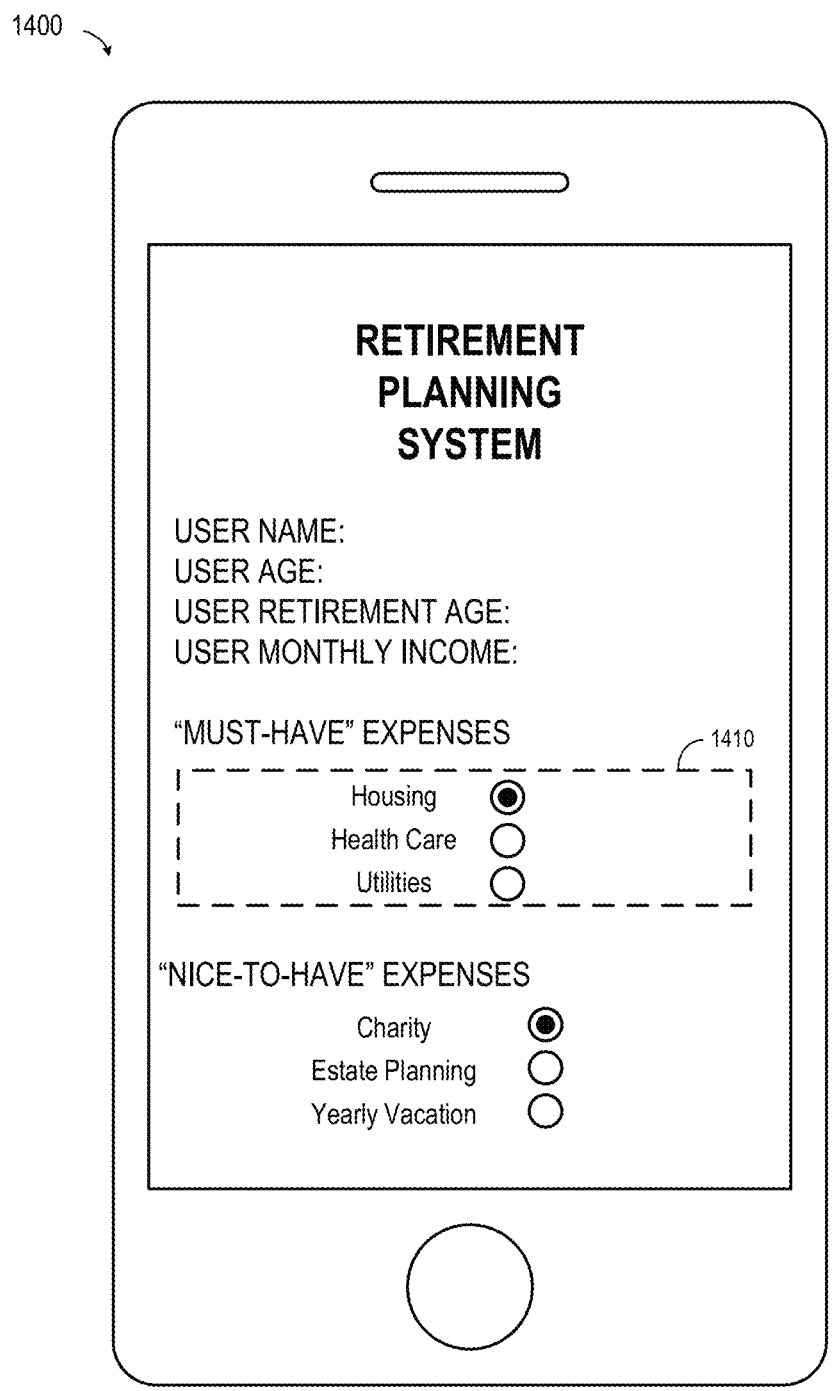
FIG. 14 is an example of a retirement planning display for a mobile device in accordance with some embodiments.

Note that any of the displayed described herein might be provided by a PC or any other device. For example, FIG. 14 is one example of a retirement planning display 1400 on a mobile device according to some embodiments. The mobile device may be any of a number of different types of mobile devices that allow for wireless communication and that may be carried with or by a user. For example, in some embodiments, the mobile device might comprise an iPhone® from Apple, Inc., a BlackBerry® from RIM, a mobile phone using the Google Android® operating system, a portable or tablet computer (such as the iPad® from Apple, Inc.), a mobile device operating the Android® operating system or other portable computing device having an ability to communicate wirelessly with a remote entity such as an retirement planning platform or engine.

The retirement planning display 1400 may let a user submit retirement data to a retirement planning platform. For example, the user may select and/or move expenses from an area 1410 of the display in order to characterize the expenses as a "must-have" or a "nice-to-have" expense (e.g., basic or optional expenses).

Figure 15:
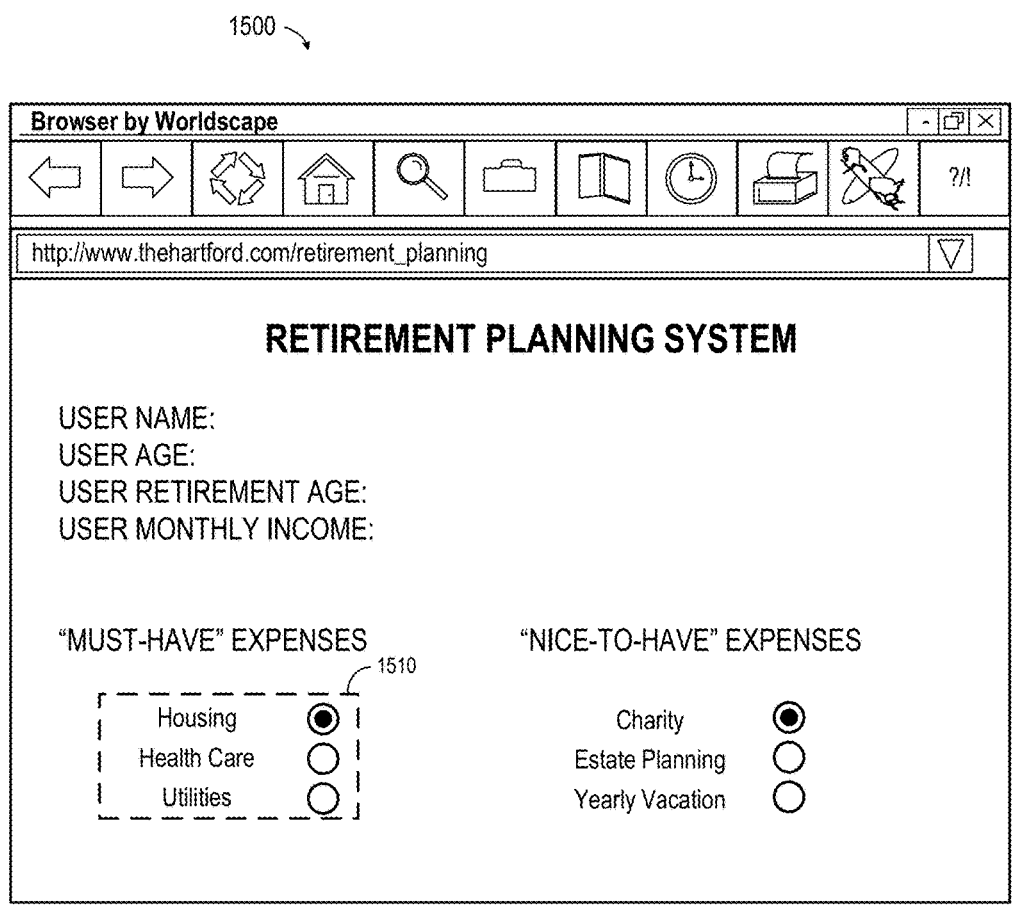
FIG. 15 is an example of a retirement planning display for a PC web browser in accordance with some embodiments.

The retirement planning display 1400 may let a user submit retirement data to a retirement planning platform. For example, the user may select and/or move expenses from an area 1410 of the display in order to characterize the expenses as a "must-have" or a "nice-to-have" expense (e.g., basic or optional expenses). Similarly, FIG. 15 illustrates a web browser and/or plug-in display 1500 (e.g., associated with an Adobe Flash interactive presentation) that may let a user submit retirement data to a retirement planning platform. As before, the user may select and/or move expenses from an area 1510 of the display in order to characterize the expenses as a "must-have" or a "nice-to-have" expense.

Figure 16:
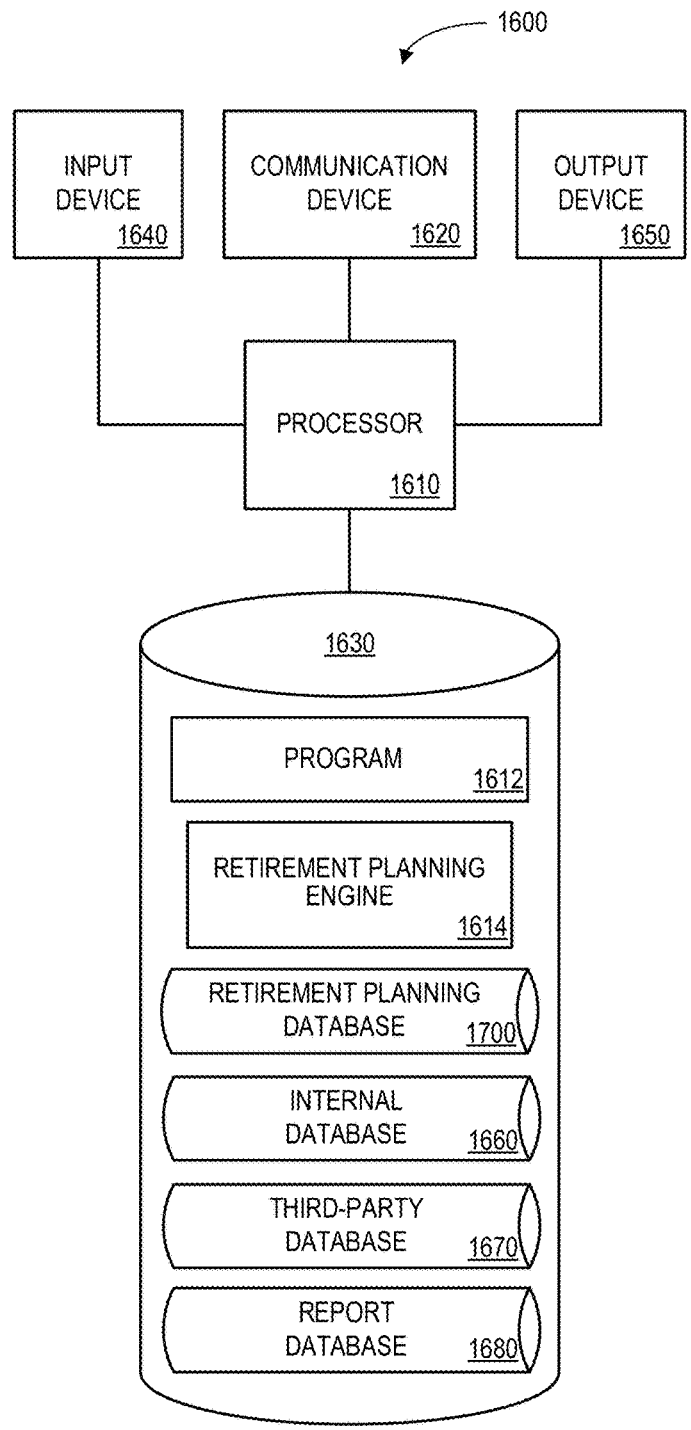
FIG. 16 is an example of a retirement planning platform according to some embodiments.

Note that embodiments described herein may be implemented in any number of different ways. For example, FIG. 16 is a block diagram overview of a retirement planning platform 1600 according to some embodiments. The retirement planning platform 1600 may be, for example, associated with the system 100 of FIG. 1. The retirement planning platform 1600 comprises a processor 1610, such as one or more commercially available Central Processing Units (CPUs) in the form of one-chip microprocessors, coupled to a communication device 1620 configured to communicate via a communication network (not shown in FIG. 16). The communication device 1620 may be used to communicate, for example, with one or more remote user devices. The retirement planning platform 1600 further includes an input device 1640 (e.g., a mouse and/or keyboard to enter retirement rule and/or model adjustments) and an output device 1650 (e.g., a computer monitor to display reports and/or aggregated results to an administrator).

The processor 1610 also communicates with a storage device 1630. The storage device 1630 may comprise any appropriate information storage device, including combinations of magnetic storage devices (e.g., a hard disk drive), optical storage devices, mobile telephones, vehicle computers, and/or semiconductor memory devices. The storage device 1630 stores a program 1612 and/or retirement planning engine 1614 for controlling the processor 1610. The processor 1610 performs instructions of the programs 1612, 1614, and thereby operates in accordance with any of the embodiments described herein. For example, the processor 1610 may categorize a first set of user goals as basic expenses and a second set of user goals as optional expenses. Icons associated with the basic expenses may be graphically displayed by the processor 1610 in a first screen area, and icons associated with the optional expenses may be graphically displayed in a second screen area. An indication that a selected icon is to be associated with one of the first or second areas may be received from a remote user (e.g., via communication device 1620). Based on the received indication, a user goal associated with the selected icon may be re-categorized by the processor 1610 (e.g., as a basic or optional expense).

The programs 1612, 1614 may be stored in a compressed, uncompiled and/or encrypted format. The programs 1612, 1614 may furthermore include other program elements, such as an operating system, a database management system, and/or device drivers used by the processor 1610 to interface with peripheral devices.

As used herein, information may be "received" by or "transmitted" to, for example: (i) the retirement planning platform 1600 from another device; or (ii) a software application or module within the retirement planning platform 1600 from another software application, module, or any other source.

In some embodiments (such as shown in FIG. 16), the storage device 1630 stores a retirement planning database 1700 (described with respect to FIG. 17), an internal database 1660 (e.g., storing account information associated with a user), and a third-party database 1670 (e.g., storing governmental interest rates that may be used in connection with retirement planning calculations). According to some embodiments, the storage device 1630 further stores a report database 1680 includes summary reports that have been generated for users. Note that the databases described herein are examples, and additional and/or different information may be stored therein. Moreover, various databases might be split or combined in accordance with any of the embodiments described herein.

Figure 17:
FIG. 17 is a tabular portion of a retirement planning database according to some embodiments.

Referring to FIG. 17, a table is shown that represents the retirement planning database 1700 that may be stored at the retirement planning platform 1600 according to some embodiments. The table may include, for example, entries identifying users who access the retirement planning platform 1600. The table may also define fields 1702, 1704, 1706, 1708, 1710 for each of the entries. The fields 1702, 1704, 1706, 1708, 1710 may, according to some embodiments, specify: a user identifier 1702, a user age 1704, user income sources 1706, user assets 1708, and user expenses (characterized) 1710. The information in the retirement planning database 1700 may be created and updated, for example, whenever data is submitted via remote user devices.

The user identifier 1702 may be, for example, a unique alphanumeric code identifying a user who is planning for his or her retirement. The user age 1704 may represent, for example, the user's current age, a predicted retirement age, and/or an age associated with a spouse. The user income sources 1706 may include, for example, predicable sources of income for the user during his or her retirement. The user assets 1708 may represent, for example, bank accounts, real estate, stocks, and/or other assets owned by the user. The user expenses (characterized) 1710 might include, for example, "basic" or "must-have" expenses as well as "optional" or "nice-to-have" expenses. Thus user may have characterized the user expenses, for example, via a graphically display such as the one illustrated in FIG. 5.

Although specific examples of information that might be stored in a retirement planning system have been described herein (e.g., in connection with the retirement planning database 1700, the internal database 1660, and/or the third party database 1670), note that many other types of information might be used in addition to, or instead of, the examples provided. For example, debt information, financial modeling information, and/or a user name and/or password associated with a social media web site might also be stored.

Figure 18:
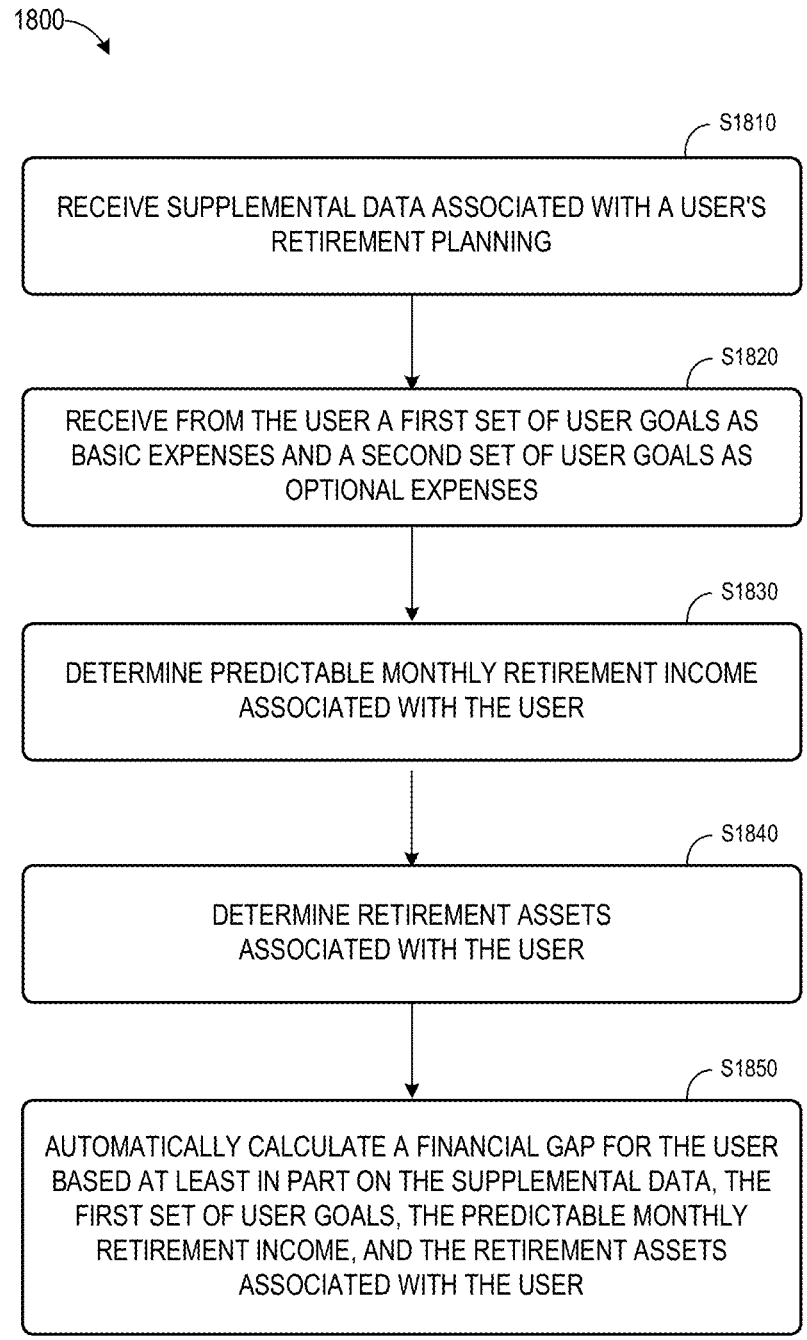
FIG. 18 illustrates a method in accordance with some embodiments.

FIG. 18 illustrates a process 1800 that might be performed, for example, by some or all of the elements of the system 100 described with respect to FIG. 1 according to some embodiments. At S1810, supplemental data associated with a user's retirement planning may be received. For example, the system may be associated with an insurance provider and the supplemental data may comprise internal data to the insurance provider, such as (i) a policy holder name, (ii) information about the user's financial accounts, and/or (iii) an insurance policy monetary value. According to some embodiments, the supplemental data comprises third-party data such as, (i) information about the user's financial accounts (e.g., from a bank or credit score source), (ii) an interest rate, and/or (iii) a dynamic governmental interest rate.

At S1820, a first set of user goals may be received from the user as basic expenses along with a second set of user goals as optional expenses. At S1830, predictable monthly retirement income associated with the user may be determined, and retirement assets associated with the user may be determined at S1840. At S1850, a financial gap may be automatically determined for the user based at least in part on the supplemental data, the first set of user goals, the predictable monthly retirement income, and the retirement assets associated with the user.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention (e.g., some of the information associated with the databases described herein may be combined or stored in external systems).

Applicants have discovered that embodiments described herein may be particularly useful in connection with retirement planning. Note, however, that other types of financial planning and related products may also benefit from the invention. For example, embodiments of the present invention may be used to in connection with financial, medical, educational, and other types of information.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A system comprising:
a back end retirement planning platform configured to:
render, for transmission to a front end remote user device, a first graphical display including a first basic expenses area of the first graphical display, a second optional expenses area of the first graphical display, and a plurality of expense icons, the first graphical display permitting user movement of each of the plurality of expense icons to one of the first basic expenses area and the second optional expenses area;
monitor the first basic expenses area of the first graphical display and the second optional expenses area of the first graphical display to detect an indication from the front end remote user device of movement of one or more of the plurality of expense icons to one of the first basic expenses area and the second optional expenses area;
responsive to receipt of the indication that one or more of said expense icons have been moved to one of the first basic expenses area and the second optional expenses area, categorize a first set of a plurality of user goals as basic expenses corresponding to ones of the plurality of expense icons moved by the user to the first basic expenses area and categorize a second set of a plurality of user goals as optional expenses corresponding to ones of the plurality of expense icons moved by the user to the second optional expenses area, said second set of the plurality of user goals being different than the first set of the plurality of user goals,
render, for transmission to the front end remote user device, a second graphical display for receiving retirement income data input corresponding to predictable monthly retirement income associated with the user,
render, for transmission to the front end remote user device, a third graphical display for receiving retirement asset data input corresponding to retirement assets associated with the user,
calculate a financial gap for the user, the financial gap comprising a difference between a total of the expense icons moved to the first basic expenses area and the predictable monthly retirement income corresponding to the retirement income data input;
render, for transmission to the front end remote user device, a fourth graphical display including a graphical representation of the financial gap, a graphical representation of a targeted monthly retirement income in an income area of the fourth graphical display, a graphical representation of assets associated with the user in an asset area of the fourth graphical display, the graphical representation of assets comprising a plurality of asset icons each representing a portion of a value of the assets, the fourth graphical display permitting user movement of one or more of the plurality of asset icons from the asset area to the income area;

monitor the income area of the fourth graphical display to detect an indication from the front end remote user device of movement of one or more of said asset icons to the income area;

responsive to receipt of the indication that one or more of said asset icons have been moved from the asset area to the income area, dynamically recalculate the financial gap for the user;

dynamically adjust the graphical representation of the financial gap on the fourth graphical display on the front end user device based on the recalculating.

2. The system of claim 1, wherein the back end retirement planning platform is further configured to:

render, for transmission to the front end remote user device, a fifth graphical display including a selectable link to generate a retirement balance sheet; and responsive to receipt, from the front end remote user device, of a selection to generate the retirement balance sheet, render, for transmission to the front end remote user device, the balance sheet.

3. The system of claim 1, wherein the back end retirement planning platform is further configured to receive supplemental retirement data, and wherein the financial gap comprises a difference between a total of the expense icons moved to the first basic expenses area and the predictable monthly retirement income corresponding to the retirement income data input in view of the supplemental retirement data.

4. The system of claim 3, wherein the supplemental retirement data comprises data received from a third-party computer system and comprises at least one of: (i) data corresponding to the user's financial accounts, (ii) interest rate data, or (iii) dynamic governmental interest rate data.

5. The system of claim 3, wherein the back end retirement planning platform is further configured to render, for transmission to the front end remote user device, a sixth graphical display for receiving retiree data input corresponding to at least two of: (i) user age data, (ii) spouse age data, (iii) current income data, or (iv) retirement age data.

6. The system of claim 1, wherein the first set of the plurality of user goals includes goals associated with at least two of: (i) housing expense data, (ii) automobile expense data, (iii) food expense data, (iv) health care expense data, and (v) utility expense data.

7. The system of claim 1, wherein the second set of the plurality of user goals includes goals associated with at least two of: (i) travel expense data, (ii) entertainment expense data, (iii) family expense data, (iv) education expense data, and (v) charity expense data.

8. The system of claim 1, wherein the back end retirement planning platform is further configured to automatically facilitate dynamic posting of retirement information corresponding to the user to a social media web site.

9. A computer-implemented method comprising:

rendering, by a back end retirement planning platform, for transmission to a front end remote user device, a first graphical display including a first basic expenses screen area of the first graphical display, a second optional expenses screen area of the first graphical display, and a plurality of expense icons, the first graphical display permitting user movement of each of the plurality of expense icons to one of the first basic expenses screen area and the second optional expenses screen area;

monitoring, by the back end retirement planning platform, the first basic expenses screen area of the first graphical display and the second optional expenses screen area of the first graphical display to detect an indication from the front end user device of movement of one or more of the plurality of expense icons to one of the first basic expenses screen area and the second optional expenses screen area;

responsive to receipt of the indication that one or more of said expense icons have been moved to one of the first basic expenses screen area and the second optional expenses screen area, categorizing, by the back end retirement planning platform, a first set of a plurality of user goals as basic expenses corresponding to ones of the plurality of expense icons moved by the user to the first basic expenses screen area and categorizing, by the back end retirement planning platform, a second set of a plurality of user goals as optional expenses corresponding to ones of the plurality of expense icons moved by the user to the second optional expenses screen area, said second set of the plurality of user goals being different than the first set of the plurality of user goals;

rendering, by the back end retirement planning platform, for transmission to the front end remote user device, a second graphical display for receiving retirement income data input corresponding to predictable monthly retirement income associated with the user, rendering, by the back end retirement planning platform, for transmission to the front end remote user device, a third graphical display for receiving retirement asset data input corresponding to retirement assets associated with the user, calculating, automatically by the back end retirement planning platform, a financial gap for the user, the financial gap comprising a difference between a total of the expense icons moved to the first basic expenses area and the predictable monthly retirement income corresponding to the retirement income data input;

rendering, by the back end retirement planning platform, for transmission to the front end remote user device, a fourth graphical display of the financial gap to the front end user device including a graphical representation of a targeted monthly retirement income in an income area of the fourth graphical display, a graphical representation of assets associated with the user in an asset area of the fourth graphical display, the graphical representation of assets comprising a plurality of asset icons each representing a portion of a value of the assets, the fourth graphical display permitting user movement of the plurality of asset icons from the asset area to the income area;

monitoring, by the back end retirement planning platform, the income area of the fourth graphical display to detect an indication from the front end user device of movement of one or more of said asset icons to the income area;

responsive to receipt of the indication that one or more of said asset icons have been moved from the asset area to the income area, dynamically recalculating the financial gap for the user;

dynamically adjusting, by the back end retirement planning platform, the graphical representation of the financial gap on the fourth graphical display on the front end user device based on the recalculating.

10. The method of claim 9, further comprising rendering, by the back end retirement planning platform for transmission to the front end remote user device, the calculated financial gap for display as a graphical representation of a screen area of a determined size separating a representation of income and a representation of expenses.

11. The method of claim 10, further comprising rendering, by the back end retirement planning platform for transmission to the front end remote user device, the representation of income as a first bar, the representation of expenses as a second bar aligned with the first bar, and the calculated financial gap as a screen location intermediate respective ends of the first and second bars.

12. The method of claim 11, further comprising rendering, by the back end retirement planning platform in providing data for display on the interactive graphical interface of the front end remote user device data indicative of the re-calculated financial gap, a resized screen area representing the financial gap.

13. The method of claim 9, further comprising generating, by the back end retirement planning platform for display on the front end remote user device, a representation of a virtual user device as an overlay on a portion of a screen display.

14. The method of claim 9, further comprising communicating, by the back end retirement planning platform, with a user handheld device in addition to the front end remote user device in parallel to exchange information with the user.

15. The method of claim 9, wherein the first set of the plurality of user goals includes goals associated with at least two of: (i) housing expense data, (ii) automobile expense data, (iii) food expense data, (iv) health care expense data, and (v) utility expense data.

16. The method of claim 9, wherein the second set of the plurality of user goals includes goals associated with at least two of: (i) travel expense data, (ii) entertainment expense data, (iii) family expense data, (iv) education expense data, and (v) charity expense data.

17. The method of claim 16, further comprising:
rendering, by the back end retirement planning platform for transmission to the front end remote user device, a fifth graphical display including a selectable link to facilitate dynamic posting of retirement information associated with the user to a social media web site;
responsive to receipt of a selection to facilitate the dynamic posting of the retirement information to the social media web site, rendering, by the back end retirement planning platform for transmission to the social media web site, the retirement information.

18. A system comprising:
a back end retirement planning platform configured to:
render, for transmission to a front end remote user device, a first graphical display including a first basic expenses area of the first graphical display, a second optional expenses area of the first graphical display, and a plurality of expense icons, the first graphical display permitting user movement of each of the plurality of expense icons to one of the first basic expenses area and the second optional expenses area;
monitor the first basic expenses area of the first graphical display and the second optional expenses area of the first graphical display to detect an indication from the front end remote user device of movement of one or more of the plurality of expense icons to one of the first basic expenses area and the second optional expenses area;
responsive to receipt of the indication that one or more of said expense icons have been moved to one of the first basic expenses area and the second optional expenses area, categorize a first set of a plurality of user goals as basic expenses corresponding to ones of the plurality of expense icons moved by the user to the first basic expenses area and categorize a second set of a plurality of user goals as optional expenses corresponding to ones of the plurality of expense icons moved by the user to the second optional expenses area, said second set of the plurality of user goals being different than the first set of the plurality of user goals,
render, for transmission to the front end remote user device, a second graphical display for receiving retirement income data input corresponding to predictable monthly retirement income associated with the user,
render, for transmission to the front end remote user device, a third graphical display for receiving retirement asset data input corresponding to retirement assets associated with the user,
receive supplemental retirement data corresponding to the user;
calculate a financial gap for the user, the financial gap comprising a difference between a total of the expense icons moved to the first basic expenses area and the predictable monthly retirement income corresponding to the retirement income data input;
render, for transmission to the front end remote user device, a fourth graphical display including a graphical representation of the financial gap, a graphical representation of a targeted monthly retirement income in an income area of the fourth graphical display, a graphical representation of assets associated with the user in an asset area of the fourth graphical display, the graphical representation of assets comprising a plurality of asset icons each representing a portion of a value of the assets, the fourth graphical display permitting user movement of one or more of the plurality of asset icons from the asset area to the income area;
monitor the income area of the fourth graphical display to detect an indication from the front end remote user device of movement of one or more of said asset icons to the income area;
responsive to receipt of the indication that one or more of said asset icons have been moved from the asset area to the income area, dynamically recalculate the financial gap for the user; and
dynamically adjust the graphical representation of the financial gap on the fourth graphical display on the front end user device based on the recalculating.

19. The system of claim 18, wherein the back end retirement planning platform is further configured to render the calculated financial gap for display as a graphical representation of a screen area of a determined size separating a representation of income and a representation of expenses, and
render the representation of income as a first bar, the representation of expenses as a second bar aligned with the first bar, and the calculated financial gap as a screen location intermediate respective ends of the first and second bars.

20. The system of claim 19, wherein the back end retirement planning platform is further configured to render, in providing data for display on the interactive graphical interface of the remote user device data indicative of the re-calculated financial gap, a resized screen area representing the financial gap.

* * * * *